3,597,384
ACRYLIC VARNISH
Václav Kugler, Richard Chromeček, Karel Kliment, Jaroslava Otoupalová, Vladimír Stoy, and Miroslav Štol, Prague, Czechoslovakia, assignors to Ceskoslovenska Akademie Ved, Prague, Czechoslovakia
No Drawing. Filed May 14, 1968, Ser. No. 728,912
Int. Cl. C08f 29/50
U.S. Cl. 260—32.6      7 Claims

ABSTRACT OF THE DISCLOSURE

Films which are fully transparent and prevent fogging of windows and the like are prepared from varnishes mainly consisting of polymers of ethyleneglycol monomethacrylate or acrylate and may contain the corresponding polymeric acrylates or methacrylates of diethyleneglycol or polyethyleneglycol, together with minor amounts of hydrophobic acrylic resins or nitrocellulose. The liquid medium of the varnish should contain a small amount of a high boiling solvent and enough volatile solvent to dissolve the resinous ingredients.

---

This invention relates to acrylic varnishes, and particularly to varnishes whose principal resinous components are polymers of the acrylates and methacrylates of ethyleneglycol, diethyleneglycol, or polyethyleneglycols.

It has been found that such varnishes, upon air drying, produce hydrophilic films which are fully transparent, and remain transparent after exposure to condensing water vapor if their principal resinous components are soluble in methanol. They are immune to blushing when applied under conditions of high ambient humidity, and prevent condensation of water in discreet droplets.

The methanol-soluble polymers employed in the varnishes of the invention may be prepared from the corresponding monomers by solution polymerization as disclosed in detail in the commonly owned, copending application Ser. No. 639,021, filed on May 17, 1967. They are equally suitable for preparing varnishes when entirely linear or when branched, and may have molecular weights of several millions.

Because branching in the polymer does not significantly affect the quality of the varnish, the polymers may be prepared from monomers which are only of a technically pure grade containing at least 0.05 percent and up to 20 percent of the corresponding diester, based on the amount of monoester present. We have successfully prepared hydrophilic, yet blush-resistant and fully transparent vinyl films from varnishes of the invention whose principal resin component was obtained by polymerizing a mixture of ethyleneglycol mono- and diesters of acrylic or methacrylic acid in which the diesters amounted to as much as 60% of the monoesters if the esters were polymerized under conditions to produce a soluble resin.

Solubility in methanol is characteristic for the acrylic resins which are the main solid component of our varnishes, but they may be prepared by polymerization in many solvents other than methanol as has been set forth in the aforementioned copending application. We prefer to carry out the polymerization in a solvent medium which is also useful as a portion of the solvent medium in the varnish, thus making it unnecessary to isolate the solid resin.

Preferred solvents for use in the polymerization therefore include ethanol, ethyleneglycol monomethyl ether and ethyleneglycol monoethyl ether. If the polymerization mixture is too dilute, a portion of the solvent may have to be removed by evaporation before compounding the varnish. Copolymers of the aforementioned esters of acrylic and methacrylic acid may also be employed.

The resinous base of our varnishes may consist entirely of monoesters of ethyleneglycol with acrylic or methacrylic acid, but may also include monoesters of diethyleneglycol, triethyleneglycol and other polyethyleneglycols with the same acids in amounts of up to 65%. They may additionally contain a minor amount, up to about 40 percent, based on the combined weight of the resinous varnish solids, of hydrophobic resins, preferably acrylics or nitrocellulose. Polyalkyl acrylates and polyalkyl methacrylates may constitute the hydrophobic resins, and may be modified in a known manner with acrylonitrile.

The hydrophobic resin component may also be combined with the hydrophilic component by copolymerization. A terpolymer of ethyleneglycol monomethacrylate with a di- or polyethyleneglycol methacrylate and methyl methacrylate is an example of such a copolymer. Other lower-alkyl methacrylates or acrylates may be copolymerized with the monoesters in an analogous manner.

The hydrophobic resin component improves the mechanical and optical properties of the films or coatings produced from the varnishes of the invention, particularly if the latter contain relatively large amounts of absorbed water. If the hydrophobic component consists of nitrocellulose, it may be either of the ester-soluble or of the alcohol-soluble type.

Blush resistance is further improved by the presence of a high boiling solvent in an amount of 3 to 40 percent of the dry resinous ingredients. The high boiling solvents should either have low volatility or they should be capable of dissolving at least some water. Typical examples of such solvents include ethyleneglycol monobutyl ether, diethyleneglycol monoethyl ether, diethyleneglycol monobutyl ether, ethyleneglycol monobenzyl ether, dimethylformamide, benzyl alcohol, cyclohexanol, and cyclohexanone. All these solvents are liquids at ordinary temperatures and have boiling points above 150° C.

The dry resinous material in the best varnishes of this invention consists of 35 percent to 100 percent polymers of diethyleneglycol or polyethyleneglycol methacrylates, and 0 to 40 percent of hydrophobic resin, all percentages and other proportions in this specification being by weight, unless specifically stated otherwise.

Suitable volatile solvents for the varnishes of the invention include glycol ethers, particularly the methyl and ethyl ethers, alkanols having up to three carbon atoms, and the esters and ketones commonly used in industry for organic coatings which are to dry to a non-tacky condition at ordinary, ambient temperature (15–20° C.) within 15 to 45 minutes.

The varnish films obtained after evaporation of the volatile solvents are hard and permanently transparent even in contact with moist air during or after application. They are particularly useful for coating the surfaces of glass windows in dwellings, vehicles, stores, and the like, and for coating sight glasses of instruments.

The following examples are further illustrative of the invention, but it will be understood that the invention is not limited to the examples.

EXAMPLE 1

The following ingredients were mixed in the order given:

| | Parts |
|---|---|
| 40% solution of polymerized ethyleneglycol methacrylate in ethyleneglycol monoethyl ether | 3.8 |
| 20% solution of polymerized polyethyleneglycol methacrylate in ethanol | 2.5 |
| 10% solution of commercial acrylic-vinyl copolymer (Vinacryl 3001) in ethyleneglycol monoethyl ether | 4.0 |
| Diethyleneglycol monobutyl ether | 0.4 |
| Benzyl alcohol | 0.2 |

Coatings of the varnish so obtained were deposited on glass panels by spraying and by brushing. They dried at room temperature within 40 minutes and were fully transparent. They were unaffected by an ambient relative humidity close to 100%.

EXAMPLE 2

Another varnish was prepared from the following ingredients:

| | Parts |
|---|---|
| 40% solution of polymerized ethyleneglycol methacrylate in ethyleneglycol monoethylether | 3.2 |
| 20% solution of polymerized diethyleneglycol methacrylate in ethanol | 3.5 |
| 10% solution of nitrocellulose (Type E 510, Wolff & Co.) in a mixture of ethyleneglycol monoethyl ether and ethanol | 3.0 |
| Cyclohexanol | 0.4 |
| Dimethylformamide | 0.2 |

Coatings of the varnish dried in air at ambient temperature within 25 minutes. They were fully transparent and moisture resistant.

EXAMPLE 3

A terpolymer was prepared by solution polymerization of 1.5 parts ethyleneglycol monomethacrylate, 0.5 part diethyleneglycol monomethacrylate, and 0.4 part methyl methacrylate as described in the afore-mentioned application. The terpolymer was dissolved in enough of a 60:40 (vol.) mixture of ethanol and ethyleneglycol monoethyl ether to produce a 25% solution to which 0.4 part ethyleneglycol monobenzyl ether and 0.2 part dimethylformamide were added.

The varnish so obtained could be deposited in very thin coatings which had all the characteristic properties of the varnish deposits of the invention and prevented fogging of glass by condensed moisture.

EXAMPLE 4

Ethyleneglycol monomethacrylate which contained 20% of the corresponding diester was polymerized in solution, and 1.3 parts of the resulting, methanol-soluble resin was dissolved together with 0.7 part Vinacryl 3001 in a 60:40 (vol.) mixture of ethanol and ethyleneglycol monoethyl ether to make a 25% solution. 0.4 part diethyleneglycol monobutyl ether and 0.2 part benzyl alcohol were added last to produce a varnish whose coatings quickly dried, and were then hard, but hydrophilic so as to prevent condensation of moisture in discreet droplets.

The esters of ethyleneglycol, diethyleneglycol, or polyethylene glycols with acrylic acid, when subjected to polymerization under the conditions described above, form resins suitable for use in the varnishes of the invention in the manner of the preferred, corresponding esters of methacrylic acid in polymer form more specifically referred to in the above examples.

What is claimed is:
1. A varnish essentially consisting of a solution of resinous material in a liquid medium,
  (a) said resinous material essentially consisting of a polymer being readily soluble in methanol and being of a molecular weight of at least 40,000, prepared by a method comprising polymerizing a monomeric mixture consisting essentially of at least 50% by weight of the said mixture of ethyleneglycol, diethyleneglycol or triethyleneglycol monoester of acrylic or methacrylic acid and at least 0.05% by weight of the said mixture of a diester of ethyleneglycol or diethyleneglycol diacrylate or dimethacrylate under conditions of free radical polymerization in solution in a solvent medium having an interaction parameter with respect to the soluble polymer of less than 0.5 and 0 to 40 percent of a hydrophobic organic polymer chosen from the class of acrylics, nitrocellulose, polyalkyl acrylates and polyalkyl methacrylates;
  (b) said liquid medium essentially consisting of a volatile organic solvent and of 3 to 40 percent of a high-boiling solvent,
    (1) said percent values being based on the total weight of said resinous material, and
    (2) the amount of said volatile solvent being sufficient to dissolve said resinous material and said high-boiling solvent.

2. A varnish as set forth in claim 1, wherein said hydrophobic organic polymer is a lower-alkyl methacrylate or acrylate, or nitrocellulose.

3. A varnish as set forth in claim 2, wherein said hydrophobic organic polymer is a lower-alkyl methacrylate in the form of a copolymer with at least one of said esters.

4. A varnish as set forth in claim 1, wherein said high-boiling solvent is normally liquid and has a boiling point above 150° C.

5. A varnish as set forth in claim 1 wherein said high-boiling solvent is ethyleneglycol monobutyl ether, diethyleneglycol monoethyl ether, diethyleneglycol monobutyl ether, ethyleneglycol monobenzyl ether, dimethylforamide, benzyl alcohol, cyclohexanol, or cyclohexanone.

6. A varnish as set forth in claim 1, wherein said monoester of ethyleneglycol is ethyleneglycol methacrylate and is present in said resinous material as a tripolymer with said monoester of diethylene glycol or polyethylene glycol and with methyl methacrylate, said methyl methacrylate in said tripolymer constituting said hydrophobic organic polymer, said terpolymer being soluble in said methanol.

7. A varnish as set forth in claim 1, wherein said monoester of ethylene glycol contains at least 0.05%, but not more than 60% of the corresponding diester of ethyleneglycol with acrylic or methacrylic acid in polymer form.

References Cited
UNITED STATES PATENTS
2,484,487  10/1949  Caldwell  260—86.1E MORRIS LIEBMAN, Primary Examiner T. MORRIS, Assistant Examiner U.S. Cl. X.R.

117—124; 260—17, 32.8, 33.2, 33.4, 86.1, 901